(12) United States Patent
Sambati (10) Patent No.: US 7,058,969 B2
(45) Date of Patent: Jun. 6, 2006

(54) RECOGNITION SYSTEM

(76) Inventor: Michael Anthimos Sambati, P O Box 76622, Mapukau City, Auckland (NZ)

( * ) Notice: Subject to any disclaimer, the term of this patent is extended or adjusted under 35 U.S.C. 154(b) by 884 days.

(21) Appl. No.: 10/142,265

(22) Filed: May 8, 2002

(65) Prior Publication Data

US 2003/0014645 A1 Jan. 16, 2003

(51) Int. Cl.
*H04L 9/00* (2006.01)
(52) U.S. Cl. .......................... 726/2; 726/27
(58) Field of Classification Search ............. 713/176, 713/182, 169; 726/2, 27
See application file for complete search history.

(56) References Cited

U.S. PATENT DOCUMENTS

| | | | | |
|---|---|---|---|---|
| 4,956,769 A | * | 9/1990 | Smith | 707/9 |
| 5,915,022 A | * | 6/1999 | Robinson et al. | 705/75 |
| 6,026,166 A | * | 2/2000 | LeBourgeois | 713/156 |
| 6,263,447 B1 | * | 7/2001 | French et al. | 726/5 |

* cited by examiner

*Primary Examiner*—Gregory Morse
*Assistant Examiner*—Thomas M. Ho
(74) *Attorney, Agent, or Firm*—Robert W. J. Usher (57) ABSTRACT

A first unit collects and stores data (bar codes 12) and reports to a second unit. The first unit keeps and communicates a first unit current record, for storage, of its (random and unpredictable) activities since last connection and a first unit past record for comparison, of its (random and unpredictable) activities up to last connection. Matching between its previously stored first unit current record and the received first unit past record makes the second unit grant access to the first unit and store the received first unit current record. The same can be done for the second unit by the first unit. Non-coupling invokes provision of extra identification, renewed coupling involving a common default set of records. Records can generate encryption keys. Random data and encryption prevent illegal access.

21 Claims, 9 Drawing Sheets

RECOGNITION SYSTEM

FIELD OF THE INVENTION

The present invention relates to systems where one unit exchanges data with another unit, and where the identity of the unit or units must be ensured.

BACKGROUND OF THE INVENTION

Situations exist where one unit must be sure of the identity of another unit with which it communicates. Security services, police forces, military organisations and commercial organisations all require to know that an interloper is not attempting access or communications. It is known to use passwords and access codes. However, should knowledge of the passwords or access codes be acquired by a non-authorised individual, there is nothing to stop the non-authorised individual gaining access to sensitive or expensive information or facilities without knowledge of the owner. The present invention seeks to improve over password and access code systems by giving the actual equipment used its own identity which cannot be covered by a fixed access code or password.

Access codes and passwords are fixed. If not fixed, they are generated, and, being generated, have a systematic predictability. The present invention seeks to provide equipment identification means which is truly random and unpredictable.

Units, communicating data to each other, have employed encryption (using an encryption key) to defeat eavesdroppers. Like access codes, encryption keys tend to be fixed, or generated according to a predictable pattern. The present invention seeks to provide encryption keys which are truly unpredictable.

SUMMARY OF THE INVENTION

The present invention seeks to provide these advantages for any system where two units communicate data, the units ranging from portable scanner applications, smartcards and remote car locking applications, to mobile telephones and high security telephone or data links.

According to a first aspect of the invention, there is provided a system for recognition of a first unit by a second unit; said first unit being operative to maintain a first unit current record including activities performed by said first unit since the last occasion of coupling to said second unit; said first unit being operative to maintain a first unit past record including activities performed by said first unit up to the last occasion of coupling to said second unit; said first unit being operative, upon coupling to said second unit, to transfer said first unit past record and said first unit current record to said second unit and said second unit being operative to store said first unit current record; and said second unit being operative to grant recognition to said first unit conditionally upon said first unit past record matching the first unit current record, stored by said second unit on the previous occasion of coupling to said first unit.

The first aspect of the invention also provides a system wherein; the second unit is operative to maintain a second unit current record including activities performed by the second unit since the last occasion of coupling to the first unit; the second unit is operative to maintain a second unit past record including activities performed by the second unit up to the last occasion of coupling to the first unit; the second unit is operative, upon coupling to the first unit, to transfer the second unit past record and the second current record to the first unit and the first unit is operative to store the second unit current record; and the first unit is operative to grant recognition to the second unit conditionally upon the second unit past record matching the second current record, stored by the first unit on the previous occasion of coupling to the second unit.

The first aspect of the invention also provides a system wherein the first unit is operative to use the first unit past record to construct a first unit encryption key and to apply the first unit encryption key to encrypt information sent to and to decrypt information received from the second unit, and wherein the second unit is operative to apply the encryption key generator to the first unit current record, stored on the previous occasion of coupling to said first unit to construct a second unit encryption key and to apply the second unit encryption key to encrypt information sent to and decrypt information received from said first unit.

The first aspect of the invention also provides a system wherein said transferring of said first unit past record includes the transferring of a random portion of the first unit past record, wherein the second unit matches the portion with the first stored unit current record and, if a match is found, transfers the entire stored first unit current record to the first unit, wherein the first unit matches the received first unit current record with the stored first unit past record, and wherein said first unit transfers the first unit current record only if a match is found.

The first aspect of the invention also provides a system wherein the first unit is operative to apply an encryption key generator to the second unit current record, received on the previous occasion of coupling to the second unit, to construct a first unit encryption key and to apply the first unit encryption key to encrypt information sent to and to decrypt information received from the second unit, and wherein the second unit is operative to apply the encryption key generator to the second unit past record to construct a second unit encryption key and to apply the second unit encryption key to encrypt information sent to and decrypt information received from said first unit.

The first aspect of the invention also provides a system wherein the first unit is operative to apply the first unit past record to an encryption key generator to generate a first unit sending encryption key to encrypt information sent to the second unit, wherein the first unit is operative to apply to the first unit current record to the encryption key generator to generate a first unit receiving encryption key to decrypt information received from the second unit, wherein the second unit is operative to apply the first unit current record, stored on the last occasion of coupling to the first unit, to the encryption key generator to generate a second unit receiving key for decrypting information received from the first unit, and wherein the second unit is operative, on receiving the first unit current record from the first unit, to apply the received first unit current record to the encryption generator to generate a second unit transmission key for encrypting information sent to the first unit.

The first aspect of the invention also provides a system wherein the second unit is operative to apply the second unit past record to an encryption key generator to generate a second unit sending encryption key to encrypt information sent to the first unit, wherein the second unit is operative to apply the second unit current record to the encryption key generator to generate a second unit receiving encryption key to decrypt information received from the first unit, wherein the first unit is operative to apply the second unit current record, stored on the last occasion of coupling to the second unit, to the encryption key generator to generate a first unit receiving key for decrypting information received from the second unit, and wherein the first unit is operative, on receiving the second unit current record, to apply the received second unit current record to the encryption generator to generate a first unit transmission key for encrypting information sent to said second unit.

The first aspect of the invention also provides a system wherein the second unit, upon failing to couple to the first unit, is operative to permit the first unit to couple to the second unit on a further occasion, upon receipt of additional identification data received in relation to said first unit, wherein the additional identification data can be received by communication with an operator at the second unit for verification and for the operator to allow said the unit to couple to the second unit, or wherein the additional identification data can be transmitted to the second unit for the second unit automatically to allow the first unit to couple to the second unit if the additional identification data is valid, and wherein the additional identification data can be provided by telephone or by an internet connection.

The first aspect of the invention also provides a system wherein the first unit, upon failing to couple to the second unit, is operative to permit coupling of the second unit to the first unit on a further single occasion, upon receipt of additional identification data received in relation to the second unit.

The first aspect of the invention also provides a system wherein the additional identification data is receivable by communication with an operator at the first unit for verification and for the operator to allow the second unit to couple to the first unit.

The first aspect of the invention also provides a system wherein the additional identification data is transmissible to the first unit automatically to allow the second unit to couple to the first unit if the additional identification data is valid.

The first aspect of the invention also provides a system wherein the additional identification data can be provided by telephone, in person, by post or by an internet connection.

The first aspect of the invention also provides a system wherein the allowing of the first unit to couple to the second unit involves the common use of a default first unit past record.

The first aspect of the invention also provides a system wherein the allowing of the second unit to couple to the first unit involves the common use of a default second unit past record.

According to the first aspect of the invention, the first unit can be a bar code scanner and the second unit can be a downloading station, Internet server, Internet database or the first unit can be a remote locking device and the second unit can be a remotely operable lock in a vehicle, or the first unit can be any data recipient or source and the second unit can be any data recipient or source.

According to another aspect of the invention, there is also provided a method, consistent with the system.

According to the invention, there is also provided a scanner, operative to download stored scanned bar codes to a downloading station in response to scanning of a control bar code.

According to the invention, there is also provided a scanner, operative to employ the laser diode, used to scan bar codes, to download information to the downloading station, or there is provided a television set top box.

BRIEF DESCRIPTION OF THE DRAWINGS

The invention is further explained, by way of example, by the following description, in conjunction with the appended drawings, in which.

And

DESCRIPTION OF PARTICULAR EMBODIMENTS

Figure 1:
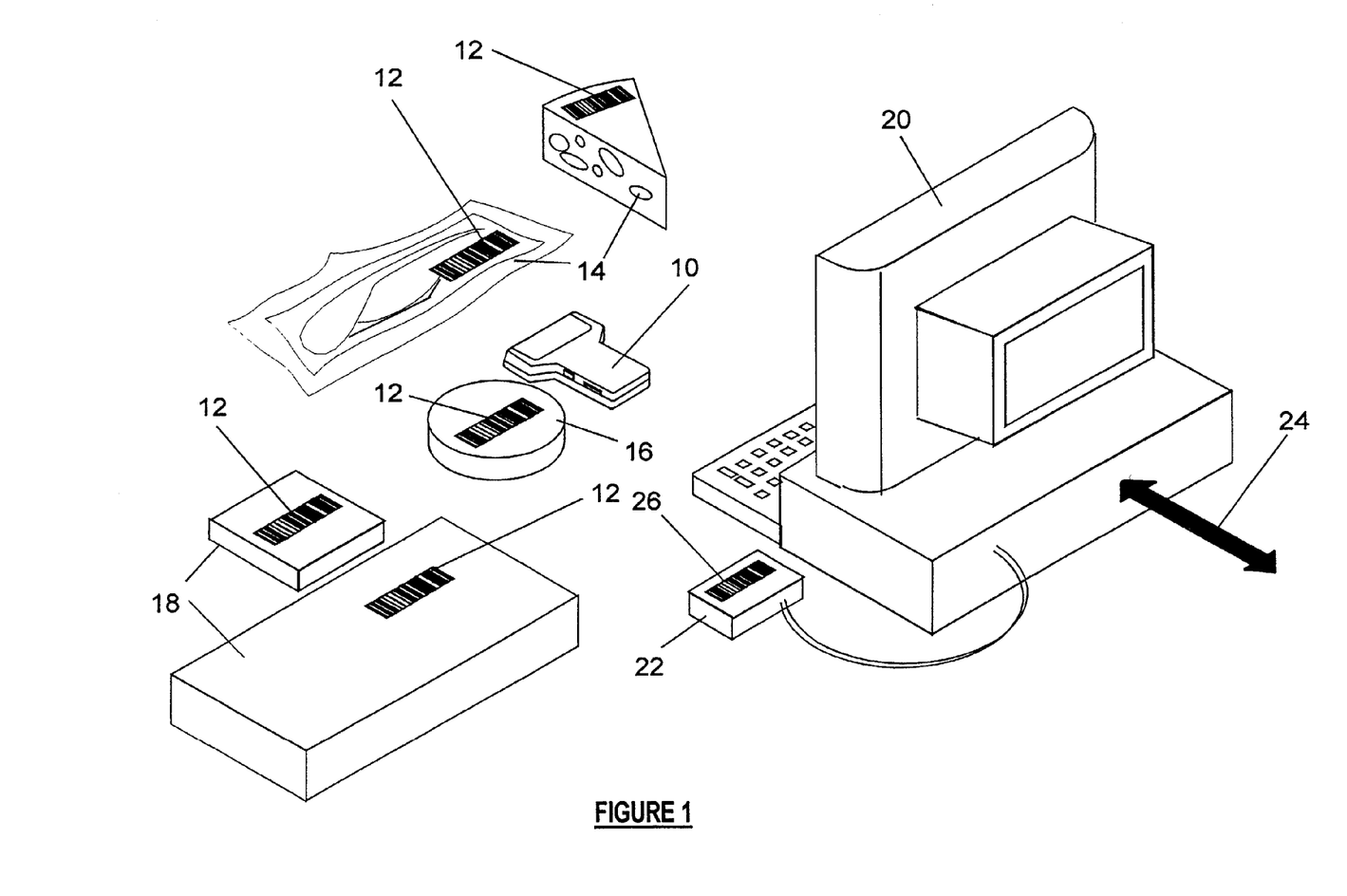
FIG. 1 is representative of the environment of a first preferred embodiment of the invention, where a portable scanner reads and downloads stored bar codes.

Attention is drawn to FIG. 1 showing the environment in which the first embodiment of the present invention is used.

A first unit, in the form of a portable scanner, 10 is carried around by a user. From time to time, the user scans bar codes 12 on items which might be found in a retail environment such as food stuffs 14, cosmetics 16 and boxed goods 18. Each bar code 12 that is scanned is stored within the portable scanner 10. The scanned bar codes may also be on documents or books which the user wishes to view or acquire. After a session of scanning, the portable scanner 10 is returned to second unit, in the form of a downloading station 20, to which a scan interface 22 is attached and which also has an Internet link 24. The bar codes 12 can also be dedicated bar codes designed solely for the purpose of responding to advertisements or articles, for example, in newspapers, magazines, on products cartons, and so on.

Figure 2A:
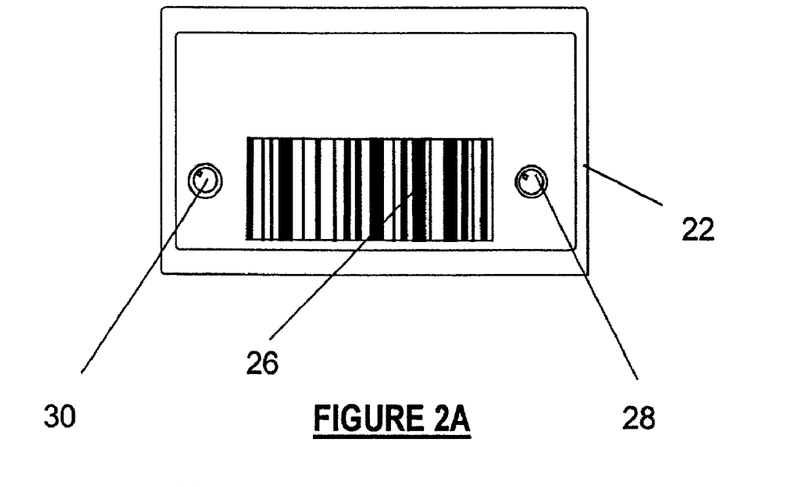
FIG. 2A shows details of scan interface of FIG. 1.

Attention is drawn to FIG. 2A showing a detailed view of the scan interface 22. The surface of the scan interface 22 comprises a control bar code 26 which instructs the portable scanner 10 to begin downloaded the bar codes 12 it has stored.

A photo detector 28 is provided to one side of the control bar code 26 and a photo emitter 30 is provided on the opposite side of the control bar code 26.

Figure 2B:
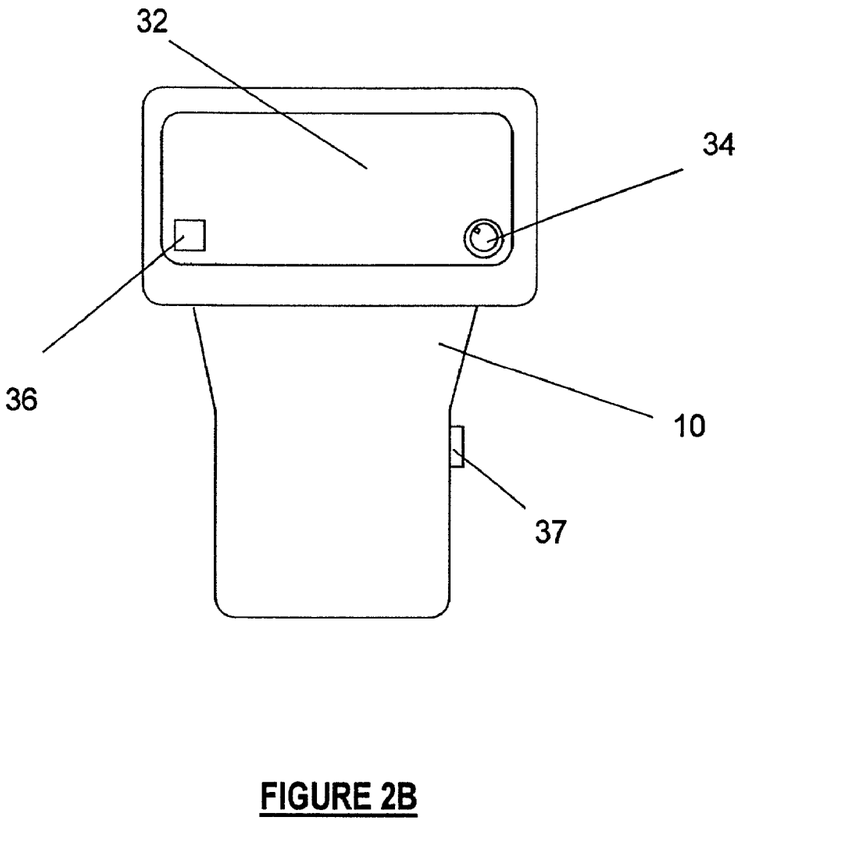
FIG. 2B shows details of the portable scanner of FIG. 1.

Attention is drawn to FIG. 2B showing details of the face of the portable scanner 10 which is presented to a bar code 12 for reading. In addition to the bar code scanning area 32 there is provided a photo detector 34 for receiving the light from the photo emitter 30 on the scan interface 22. A rest point 36 indicates where the beam of the laser diode used to scan bar codes 12, in the portable scanner 10 comes to rest when the portable scanner 10 is not actually scanning.

In order for the portable scanner 10 to communicate with the downloading station 20, the portable scanner 10 is placed over the control bar code 26 so that the photo detector 34 is within the light field of the photo emitter 30 and the photo detector 28 is within the light field around the rest point 36, should the laser diode in the portable scanner 10 be switched on and not scanning.

When the portable scanner 10 scans the control bar code 26, it recognises the control bar code 26 and interprets it as an instruction that it must download (send to the downloading station 20) the bar codes 12 that is has scanned on the various goods. To do this, the portable scanner 10 modulates the laser diode, aimed at the rest point 36, to send the information as a stream of serial data bits to be detected by the photo detector 28 and fed, for interpretation, to the downloading station 20. Likewise, the downloading station 20 can indicate epochs in the transfer of data, to the portable scanner, 10 by modulating the photo emitter 30 whose serial streams of data bits is detected by the photo detector 34 for the portable scanner 10 to respond thereto.

The downloading station 20 acquires connection with the Internet by means of the Internet link 24. The downloaded bar codes 12 can be used, either directly or from a data base, as internet addresses to bring up information relating to the goods whose bar code 12 has been scanned.

Equally, the downloaded barcodes 12 can be used as addresses to access a database, rather than be sent via the internet. The scanned barcodes 12 need not be on goods, but can be provided as readily acquirable tags on a list of items.

Figure 3:
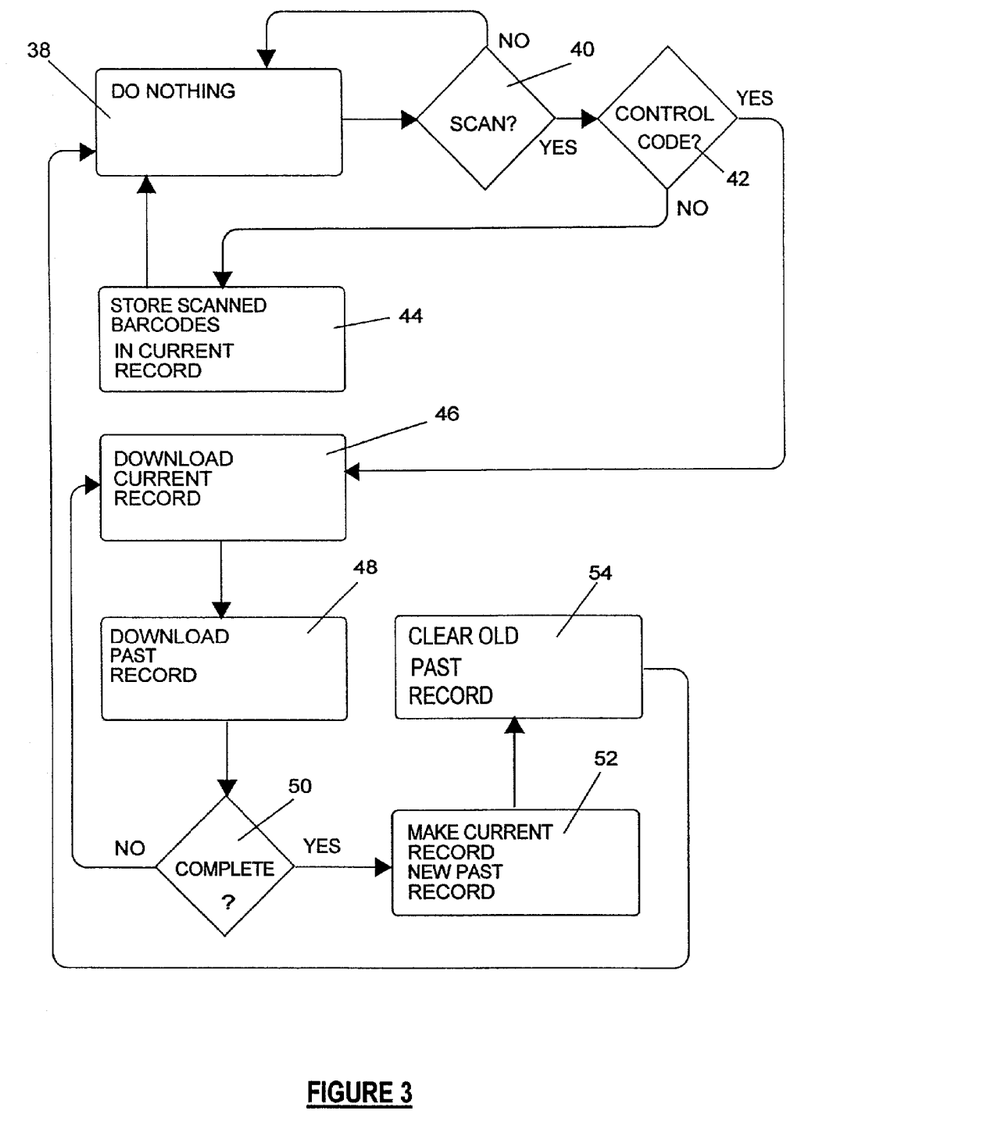
FIG. 3 is a flow chart of the activities of the portable scanner of FIG. 1 and FIG. 2B.

Attention is drawn to FIG. 3 showing a flow chart of the activities of the portable scanner 10 during bar code 12 collection and action at the downloading station 20. A first operation 38 has the portable scanner 10 in a rest state awaiting instructions. A first test 40 detects if the "scan" button (item 37 in FIG. 2B) has been pushed. If the scan button 37 has not been pushed, the portable scanner 10 remains in the idling state of the first operation 38. If the scan button 37 has been pushed, a second test 42 looks to see if the scanner 10 is scanning the control bar code 26. A second operation 44 reads the bar code 12 being scanned and stores it in the portable scanner 10 memory as part of a current record. Having scanned the bar code 12 and stored it in the current record, the second operation 44 returns control to the first operation 38.

In this way, a plurality of bar codes 12 are scanned and stored in the current record of the portable scanner 10.

If the second test 42 detects that the portable scanner 10 is scanning the control bar code 26, a third operation 46 has the portable scanner 10 download (transmit) the contents of its current record to the downloading station 20 for connection on the Internet link 24 or to a local database. A fourth operation 48 then downloads a past record of the activities of the portable scanner 10. The past record was the previous current record of the portable scanner 10, downloaded to the downloading station 20 on the last occasion that the portable scanner 10 was coupled to the scan interface 22. A third test 50 checks to see if the downloading of the current record and the past record is complete. This can be signalled, by the downloading station 20 through the scan interface 22 to the portable scanner 10. If downloading is not complete, downloading continues until the third test 50 detects or receives notification that downloading is complete. A fifth operation 52 then swaps the portable scanner's 10 downloaded current record to become the portable scanner's 10 past record. A sixth operation 54 then clears the old past record from the portable scanner 10 and returns control to the first operation 38. As an option, the fifth operation 52 can have the scanner 10 rescan the control bar code 14 before swapping the current record for the past record, to ensure that the scanner 10 is still within the range of downloading station 20 thus to ensure that transfer of the current record will have been complete. As a further option, instead of transmitting the whole of the past records to the downloading station 20, the scanner 10 randomly selects a portion of the past record and sends it to the downloading station 20. The downloading station 20 scans it's stored current record to match the portion. If a match is found, the downloading station 20 sends the whole of its current record to the scanner 10. The scanner 10 checks to see that what it received from the downloading station 20 matches its past record. Only then does it send its current record, both units 10 20 being assured of their mutual identities.

Figure 4:
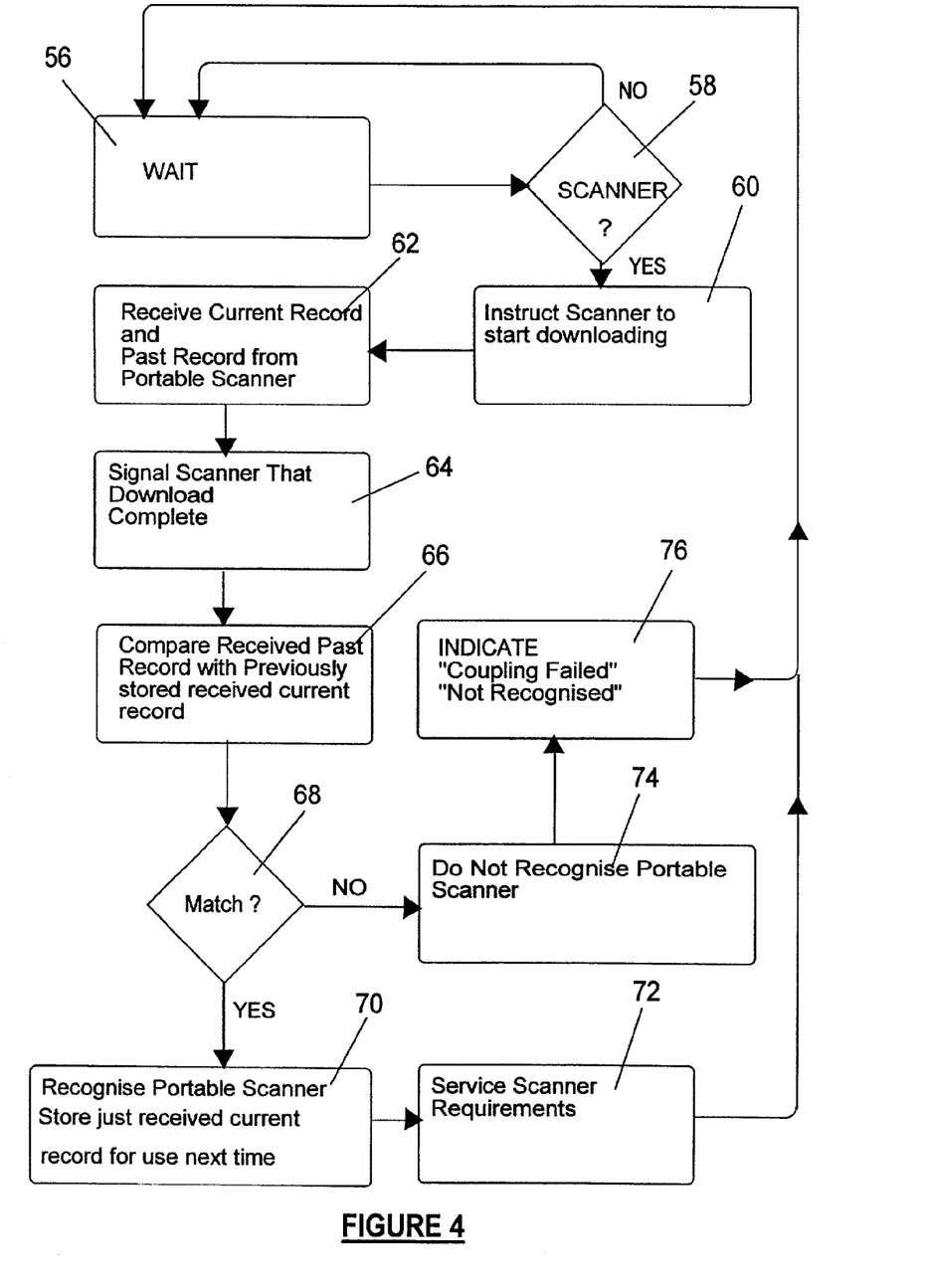
FIG. 4 is a flow chart of the activities of the downloading station of FIG. 1 when interacting with the portable scanner.

Attention is drawn to FIG. 4 showing the activity of the downloading station 20 when recognising or not recognising the portable scanner 10. While the activity is shown as being undertaken by the downloading station 20, it can equally be undertaken by the local database or by the entity coupled via the internet link 24, in the whole or in part.

Starting from a rest state in a seventh operation 56, a forth test 58 looks to see if the scanner 10 is present on the scan interface 22. This can be achieved by looking for the activity of the laser diode, in the scanner 10, as it reads the control bar code 26. If the scanner 10 is not present on the scan interface 22, control passes back to the seventh operation 56. If the scanner 10 is present on the scan interface 22, an eighth operation 60 instructs the scanner 10 to commence downloading. This can be achieved by presenting a signal on the photo emitter 30 to be picked up by the photo detector 34 on the scanner 10.

Once the scanner 10 has been instructed to start downloading, a ninth operation 62 receives, from the scanner 10, the current record of all the bar codes 12 the scanner 10 has scanned since last coupling to the downloading station 20, and the scanners 10 past record of all of those bar codes 12 that the scanner 10 has scanned up to the previous occasion on which the scanner 10 coupled to the downloading station 20.

When the scanner 10 current record and past record have been downloaded, a tenth operation 64 signals, to the scanner's 10 that the download is complete. The signalling can be achieved in the same manner used to instruct the scanner in the eighth operation 60.

Having signalled to the scanner 10 that the download is complete, an eleventh operation 66 compares the past record, just received from the scanner 10 in the download of the ninth operation 62, with the scanner's 10 current record which was previously downloaded and stored by the downloading station 20, on the last occasion when the scanner 10 coupled to the downloading station 20. If a fifth test 68 finds that a match exists, a twelfth operation 70 recognises the authenticity and identity of the scanner 10 and passes control to the thirteenth operation 72 where the requirements of the scanner 10 are serviced. These services are not part of the present invention, but for completeness can included presentation of data from a database concerning the bar codes 12 downloaded with the current record from the scanner 10, or can included access via the Internet link 24 to remote services and web site (selected by bar codes 12) where information can be obtained. Other services can be reading web based email, viewing bank accounts, shopping, and so on. All of which can be carried out in a highly secure yet mobile environment.

The thirteenth operation 72 being complete, control returns to the seventh operation 56 where input from the scanner 10, or another scanner is awaited.

If the fifth test 68 indicates that no match was found in the eleventh operation 66, a fourteenth operation 74 has the downloading station 20 not recognising the portable scanner 10. A fifteenth operation 76 then provides an indication, either by signalling to the scanner 10 and/or placing an indication on a warning light or on a screen, that coupling has failed and that the scanner 10 has not been recognised. The fifteenth operation 76 then passes control back to the seventh operation 56 where the downloading station 20 awaits further input from the scanner 10.

Figure 5:
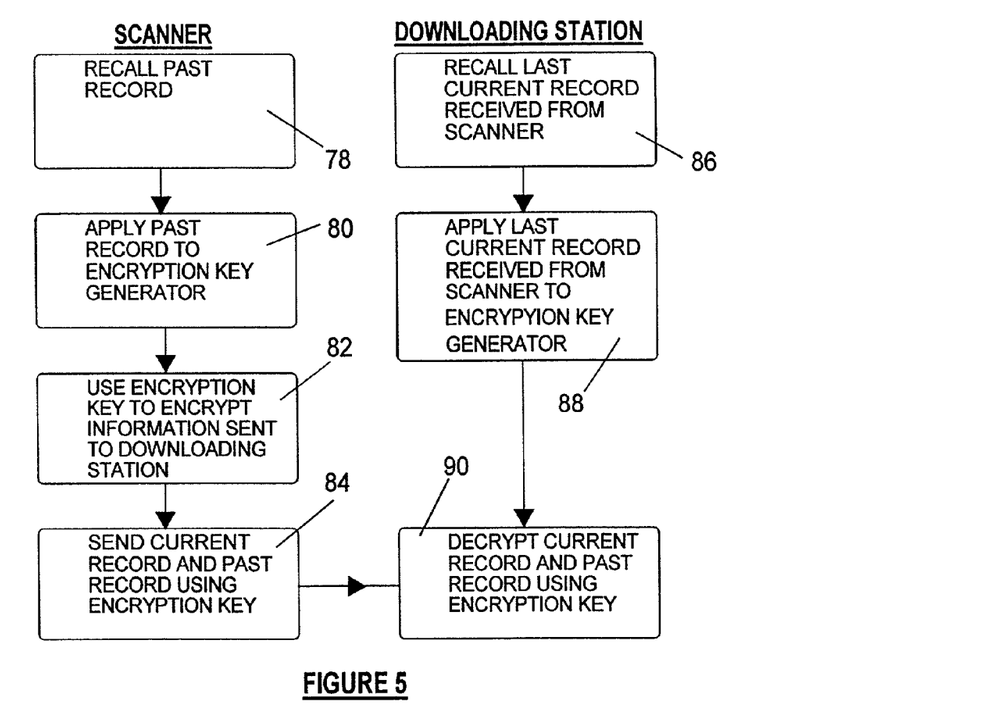
FIG. 5 is a chart of the co-operation between the scanner and the downloading station when generating and employing a common encryption key.

Attention is drawn to FIG. 5 showing how the scanner 10 (depicted in the left hand column) and the downloading station 20 (depicted in the right hand column) cooperate to add further security to their coupling. The features shown in FIG. 5 can also act as a means of recognition of the scanner 10 by the downloading station 20.

In a sixteenth operation 78 the scanner 10 recalls its past record of bar codes 12 which it scanned between the last occasion on which it was coupled to the downloading station 20 and the occasion before that. A seventeenth operation 80 then has the scanner 10 applying the recalled past record to an encryption key generator. The type of encryption key generator can be any kind known to those skilled in the art. As an example, the numeric representation of the bar codes 12 in the recalled past record can be "exclusive or" added, and/or selected portion of the resulting word used as a seed for a random number generator. As another example the resulting binary digits can be shuffled accordingly to a known rule and all or some of the shuffled binary digits applied as an encryption key. As another example, the numeric values of the scanned bar codes 12 in the recalled past records can be added together to make a binary sum, all or some of the binary sum being applied as the encryption key. The invention is not limited by these examples. Any manner of generating or encryption key from input data can be used in the seventeenth operation 80.

Having generated an encryption key, the scanner 10, in an eighteenth operation 82 uses the encryption key, created in the seventeenth operation 80, to encrypt all information sent to the downloading station 20. In a nineteenth operation 84 the scanner 10 sends its current record and its past record to the downloading station 20, all encrypted using the encryption key generated in the seventeenth operation 80.

Prior to this, the downloading station 20, in a twentieth operation 86 has recalled the last current record it received from the scanner 10 on the last occasion that it coupled to the scanner 10. It is to be recalled that the last current record, stored in the downloading station 20, corresponds to the past record stored in the scanner 10.

A twenty first operation 88 then has the downloading station 20 apply its last recalled current record received from the scanner 10 to the same encryption key generator employed by the scanner 10 in the seventeenth operation 80. Because the past record of the scanner 10 is the same as the recalled last current record received from the scanner 10 by the downloading station 20, the encryption keys which are generated by the seventeenth operation 80 and the twenty first operation 88 should be identical.

A twenty second operation 90 has the downloading station 20 decrypting messages sent from the scanner 10 using the encryption key generated in the twenty first operation 88. If the two encryption keys generated in the seventeenth operation 80 and the twenty first operation 88 match, the downloading station 20 can receive information from the scanner 10 in a recognisable form. If the encryption keys do not match, the coupling attempt will fail.

The activities shown in relation to FIG. 5, have the additional benefit that, not only is a failure to couple between the scanner 10 and the downloading station 20 automatically provided, but any eavesdropper trying to intercept data, sent by the scanner 10 to the downloading station 20, cannot begin to hope to predict what the encryption key, generated in the seventeenth operation 80, might be. The very random nature of the different bar codes 12 that the scanner 10 might have stored its past record means that there is no systematic method for an eavesdropper to make any guesses at what the encryption key might be.

Figure 6:
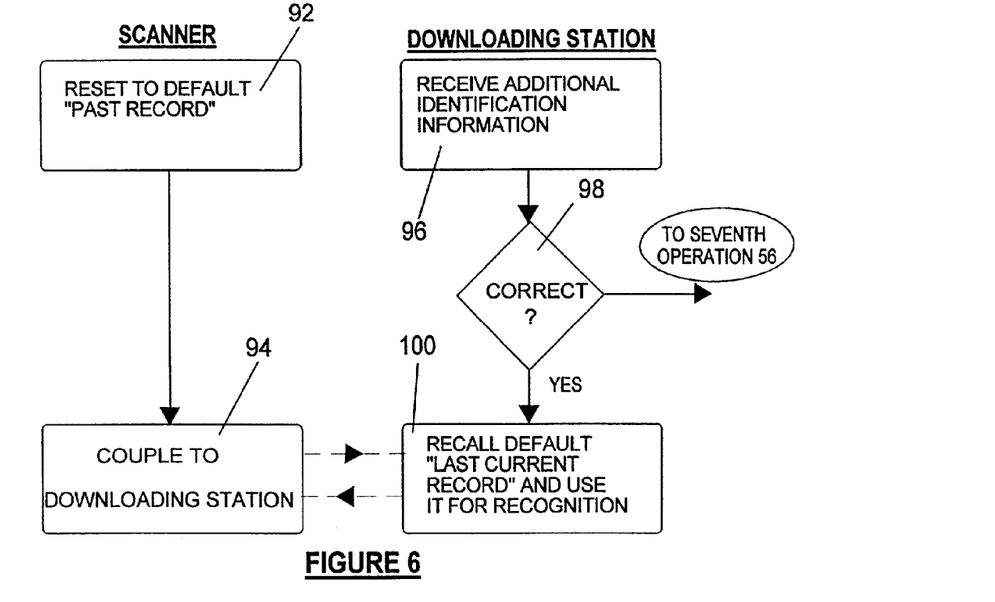
FIG. 6 is a chart of the co-operation between the scanner and the downloading station when re-synchronising after failure to couple.

Attention is drawn to FIG. 6 showing the activity of the scanner 10 (depicted in the left hand column) and the downloading station 20 (depicted in the right hand column) when recovering from a failure to couple as illustrated in FIG. 4 from the fifth test 68 through the fourteenth operation 74 and the fifteenth operation 76.

A twenty third operation 92 has the scanner 10 reset itself to a default past record. This need not be a record of any real activity. It can simply be an agreed dummy past record which is known both to the scanner 10 and the downloading station 20. Equally it can be a real past record which it has been set(selected) to be the default past record. The default past record can be a bar code, printed on a letter, posted, used once and discarded. The scanner 10, in a twenty fourth operation 94, again attempts to couple to the downloading station 20.

Prior to this point the downloading station 20 in a twenty fifth operation 96, has received additional identification information relating to the scanner 10. The additional identification information can be received by a telephone operator, or by an Internet connection, by the presentation of a recognisable token such as a key or magnetic swipe card, or can be entered by the keyboard of a computer. The nature of the additional information and its manner of presentation to the downloading station 20 is not important in this invention. What is important is that the additional identification information can be presented to the downloading station 20.

If a sixth test 98 detects that the received additional identification information is valid, a twenty sixth operation 100 has the downloading station 20 recall the default (as a default scanner 10 past record) last current record, which it shares in common with the scanner 10, should the scanner 10 be the scanner that the downloading station 20 believes it to be. Both the scanner 10 and the downloading station 20 then proceed with the recognition process using the recalled default last current record (being the default past record of the scanner 10). If the recalled default last current record in the downloading station 20 tallies with the default past record in the scanner 10, recognition can proceed. The default past current record replaces the past record, used by the scanner in the activities shown in FIG. 3, 4 and 5. The default last current record in the downloading station 20 replaces the stored received current record of the scanner 10 in the activities shown in FIGS. 3.4 and 5.

The default past record does not remain active for more then one coupling of the scanner 10 to the downloading station 20. As soon as a successful coupling has taken place, the scanner 10 replaces its default past record with the current record it has just downloaded. In the downloading station 20 the recalled default record is replaced by the actual current record downloaded by the scanner 10. Having come out of synchronicity, the scanner 10 and the downloading station 20 automatically gain a new synchronicity by the use of a default past record which is instantly discarded until required again on some later occasion.

If the sixth test 98 finds that the additional identification information received by the downloading station 20 is not correct and does not tally for the particular scanner 10 trying to couple to the downloading station 20, the downloading station simply gives up and returns to the waiting state 56 shown in the seventh operation 56 on FIG. 4.

Figure 7:
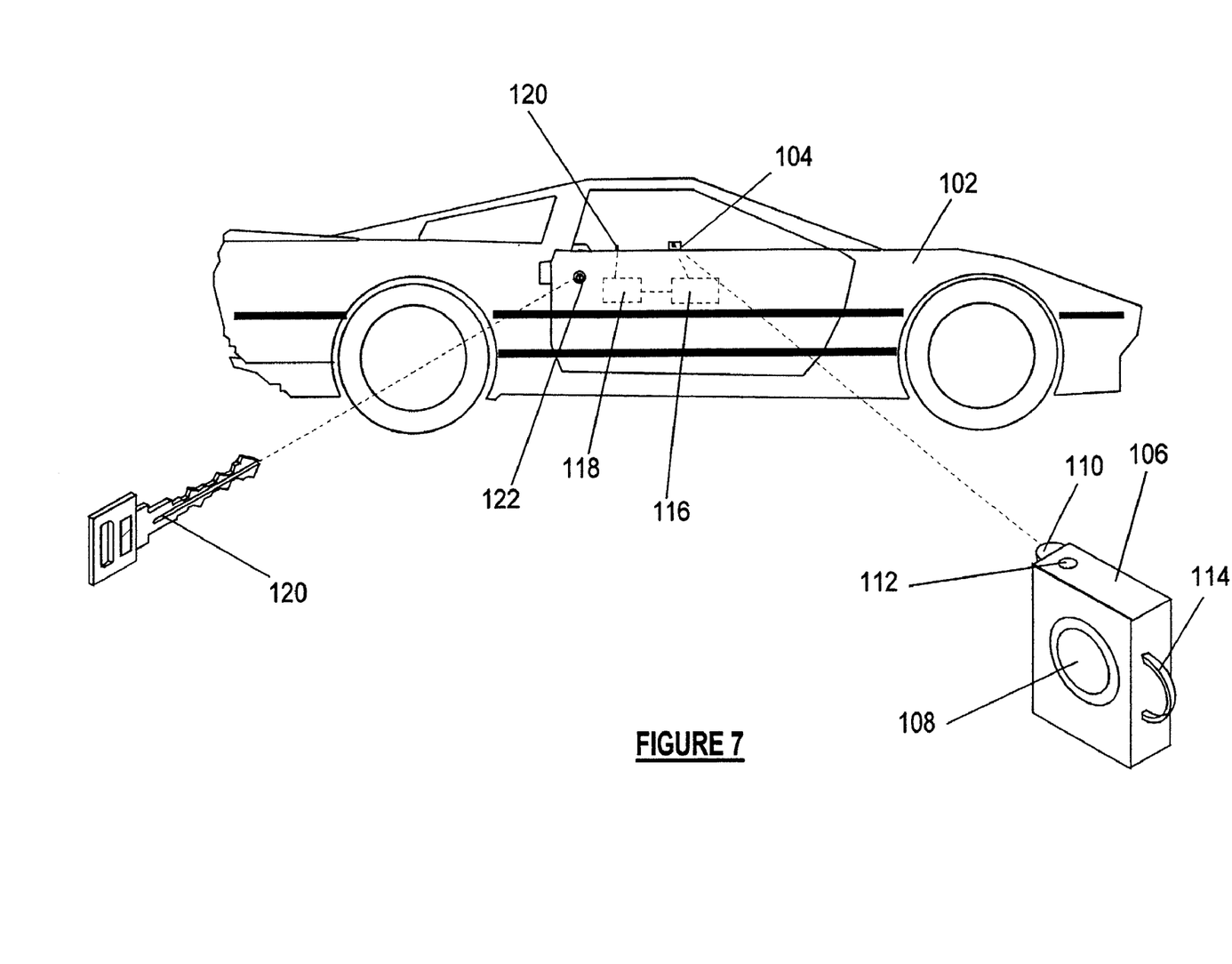
FIG. 7 shows the environment of an automobile, or other vehicle, remote locking system, wherein a second embodiment of the invention is applied.

Attention is drawn to FIG. 7, showing a situation where a second embodiment of the present invention is beneficially employed.

An automobile 102 (or any other type of vehicle), as is known in the art, comprises an electronic locking system where an infrared sensor 104 picks up an infrared signal from a first unit, in the form of a remote locking device 106. The remote locking device 106, comprises an activating push button 108, a transmitting infrared light emitting diode 110 and a secondary light emitting diode 112 (to indicate to the user when the transmitting infrared light emitting diode 110 is activated). A loop 114 is generally provided so that the remote locking device 106 may be kept on a keyring.

In the automobile 102, the infrared sensor 104 drives a second unit, in the form of a decoding unit 116, which decodes an identifying serial data word, identifying the remote locking device 106, modulated on the infrared signal sent from the remote locking device 106 to the infrared sensor 104. If the identifying code, sent from the remote locking device 106, matches a code stored in the decoding unit 116, the decoding unit 116 activates a solenoid 118 which opens the lock 120 on the door of the automobile 102. On leaving the automobile 102, the same process, in reverse, causes the solenoid 118 to lock the doors of the automobile. The automobile can also be mobilised or immobilised.

In common with usual practice, a key 120 can be inserted into a keyhole 122 to open and close the doors of the automobile 102 in the normal, more traditional manner. The present invention, in this embodiment, provides an improvement in security over the arrangement shown in FIG. 7. A problem exists in that devices exist for capturing and copying the modulated infrared signal from the remote locking device 106. Once the user of the automobile 102 has locked the automobile with the remote locking device and left the area, the captured code can be used to open and remove the automobile 102 against the owner's wishes. Equally, there exist devices which, when presented to a packed carpark, run through all of the possible identification codes for a remote locking device 106. When an automobile 102 receives a correct identification code for a remote locking device 106, it generally unlocks its doors, mobilises and flashes its lights so that the potential thief is alerted to the fact that the car has unlocked and even go so far as to identify which car it is. The present invention, as applied in the second embodiment of FIG. 7, provides a system where the identification code for a remote locking device is never twice the same and where the use of a device sending all identification codes via an infrared device would have its task of minutes spreading to thousands of years even to open one car in a packed carpark.

While the embodiment is described for infrared devices, it also applies to radio and ultrasonic devices, or any other signalling means which can be so used.

Figure 8:
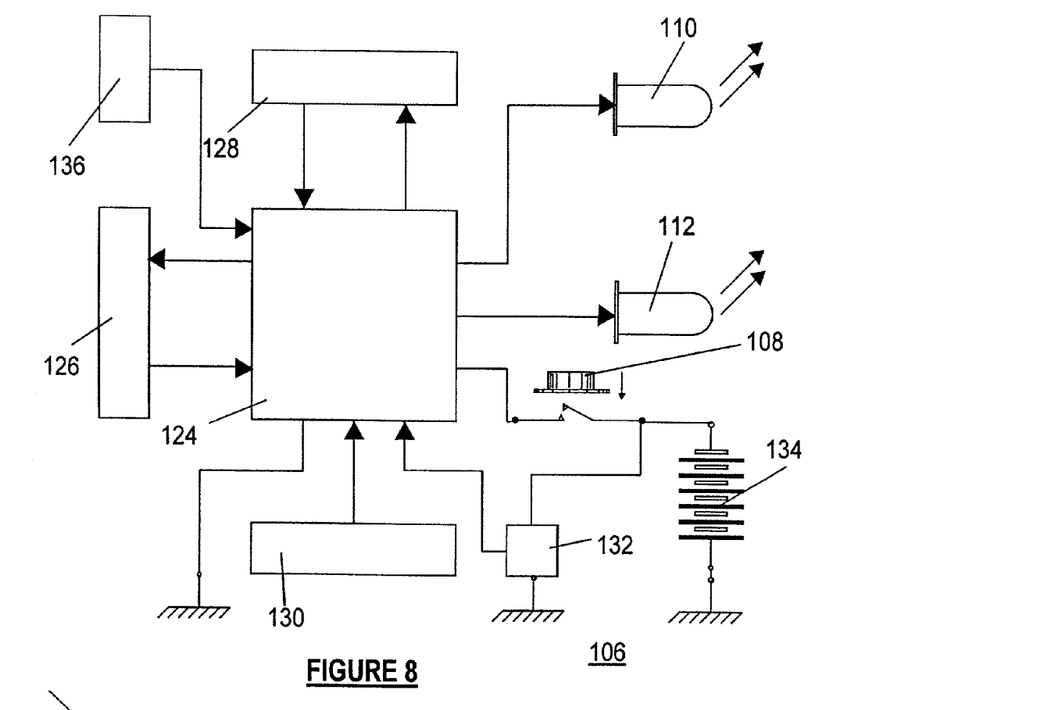
FIG. 8 is a schematic diagram of one possible way the remote locking device of FIG. 7 can be embodied.

Attention is drawn to FIG. 8, showing a schematic diagram of one manner of constructing the remote locking device 106, otherwise shown in FIG. 7.

The remote locking device 106 comprises a controller 124 which has associated therewith a current record memory 126, a past record memory 128 and authorisation code read-only memory 130. The authorisation code is the identification code which is normally used in automobile 102 remote locking/unlocking devices.

Also associated with the controller 124 is a free running clock 132. The controller 124 can drive the transmitting light emitting diode 110 and the secondary light emitting diode 112.

A battery 134 is wired such that the free running clock 132 runs continuously, but the controller 124 and its associated parts 126, 128, 130 are powered only when the push button 108 is pressed by the user.

If so desired, the free running clock 132 can be an accurate clock. This is not necessary. The object of the free running clock 132 is simply to provide a running count, which changes with time, and which can be read by the controller 124 at the instant the push button 108 is pressed. A similar clock can be used in the scanner 10 of the first embodiment, in place of the verification use of the past record or as an adjunct thereto, the time of coupling being recorded as an adjunct to the current record. This is especially useful if the scanner 10 has not scanned any bar codes 12 since the last occasion of coupling.

When the push button 108 is pressed, the controller 124 acquires the running count from the free running clock 132 and places it in the current record memory 126. The controller 124 then acquires the contents of the past record memory 128 and of the authorisation code read-only memory 130. The contents of the authorisation code read-only memory 130, the current record memory 126 and the past record memory 128 are concatenated and used, as serial binary data, to modulate the output of the transmitting infrared light emitting diode 110. At the same time as the transmitting infrared light emitting diode 110 is being driven by the controller 124, the controller 124 also drives the secondary, visible light emitting diode 112 to alert the user that data is being sent.

The content of the current record memory 126 is then placed into the past record memory 128 to become the past record.

Because the content of the current record memory 126 is the happen-stantial count, (which continuously runs and rolls over when a limit is reached) of the free running clock 132, the stream of binary serial data sent by the transmitting infrared light emitting diode 110 is seldom if ever twice the same.

As a further refinement over the remote locking device 106 shown in FIG. 8, it is also possible to employ an encryption scheme as described with reference to FIG. 5.

Figure 9:
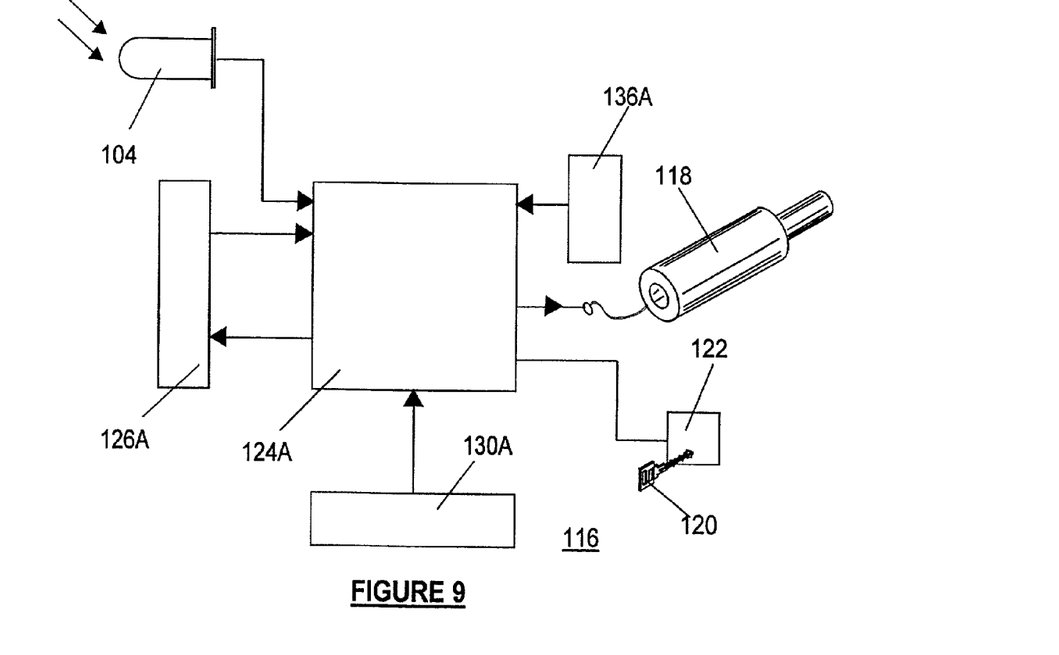
FIG. 9 is a schematic diagram of one possible way the decoding unit of FIG. 7 can be embodied.

Attention is drawn to FIG. 9 showing a schematic diagram of the decoding unit 116 located in the automobile 102.

The infrared light signal, detected by the infrared sensor 104, is provided to a decoding unit controller 124A which also comprises a controlling unit authorisation code memory 130A, and a controlling unit current record memory 126A. When the stream of serial binary digits is received from the infrared sensor 104, the concatenated information is compared. The decoding unit controller 124A compares the authorisation code, received from the remote locking device 106, with the contents of the decoding unit authorisation code memory 130A. If they match, the decoding unit controller 124A goes on to compare the past record, received form the remote locking device 106 with the content of the decoding unit current record memory 126A if they match, the decoding unit 116 activates the solenoid 118 to lock or unlock the automobile 102. The current record, received from the remote locking device 106, is then used to replace the content of the decoding unit current record memory 126A.

If the past record, received from the remote locking device 106, does not match the contents of the decoding unit current record memory 126A, the solenoid 118 is not activated. The decoding unit 116 will continue to deny recognition to the remote locking device 106 until further identification information in the form of the key 120 being able to open the lock by use in the keyhole 122 is provided. At this moment, the decoding unit 116 again becomes receptive to signals from the remote locking device 106, but this time using a decoding unit default past record memory 136A in place of the decoding unit current record memory 126. Returning briefly to FIG. 8, the remote locking device 106 also comprises a remote locking device default past record memory 136. If the push button 108 is depressed for more than a predetermined time, in this case, 20 seconds, the remote locking device controller 124 selects the remote locking device default past record memory to be used in place of the remote locking device past record memory 128.

When the push button 108 is again depressed, the decoding unit 116 is able to operate the solenoid 118 because the contents of the default past record memories 136–136A are the same. As the solenoid 118 is successfully operated, the decoding unit 116 and the remote locking device 106 revert to their previous mode of operation. The default past record memories 136–136A will not be called into use again until a failure to operate the solenoid 118 again occurs. Further, because of reversion to the normal method of operation, the value of the free running clock 132 count at the moment of pushing the button 108 becomes the recognisable past record of the remote locking device 106 so that the same stream of binary digits is not again sent from the remote locking device 106 to the decoding unit 116. As an alternative, to minimise the problem of new "keyless" cars, and the need to re-synchronise if the locking device 106 is "out of range" the locking device 106 can be allowed more than one attempt before default mode is entered. A particularly elegant solution has the locking device 106 reading a bar code, etched into the window or bodywork of the vehicle (or acquiring some other input from the vehicle) to ensure it is within range, before making a second normal attempt or a default attempt. In particular, the bar code (or other signal) obtained from the vehicle 102 can be used, instead of a key 120, to enter default mode. Like the key, this has the advantage of being vehicle specific. The locking unit 106 can read the bar code and transmit it to the decoding unit 16. If the decoding unit 106 recognises the bar code, default operation ensues. The locking device 106 can be adapted only to transmit the bar code to the decoding unit 116 if the locking device 106 recognises the bar code.

Figure 10:
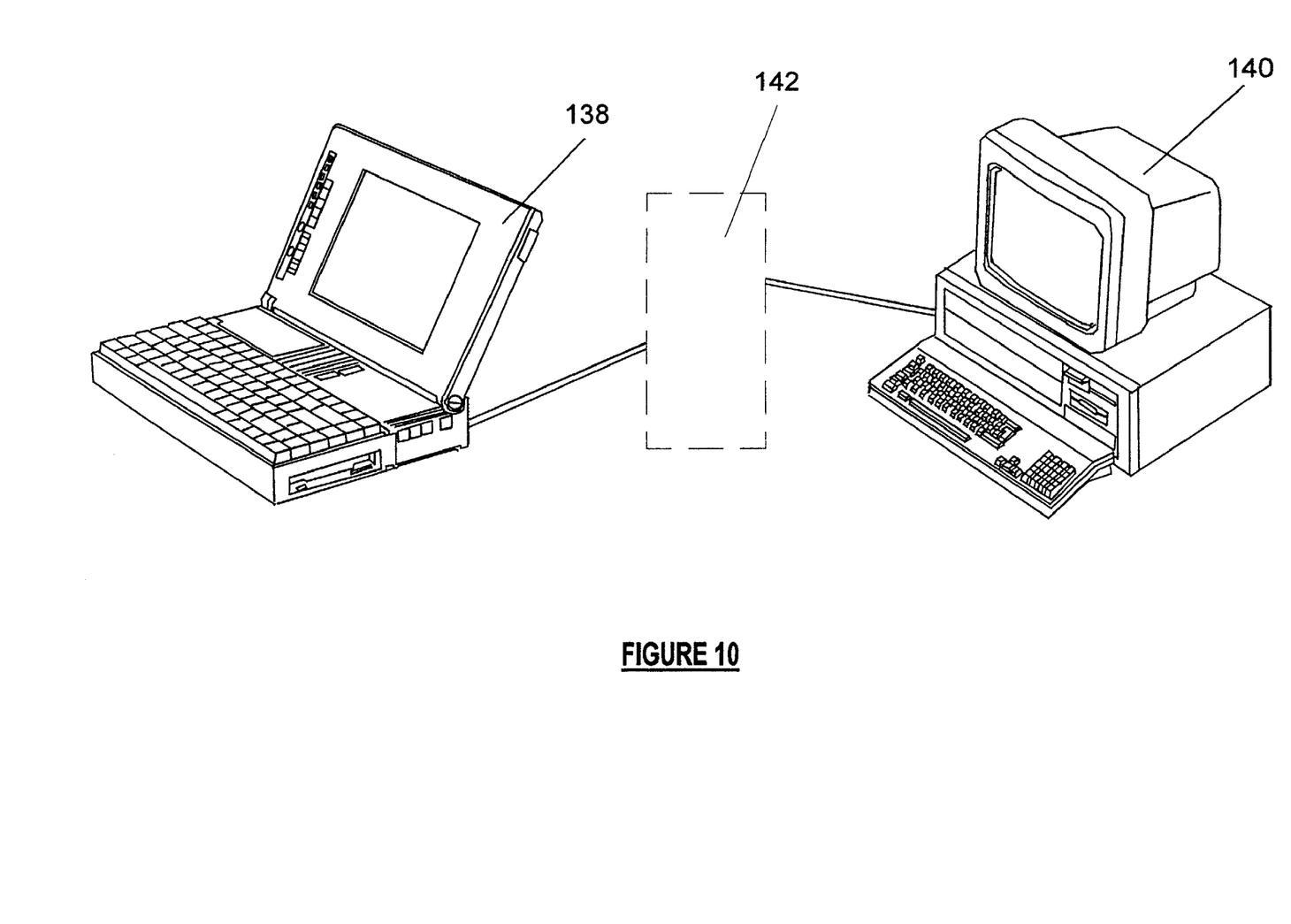
FIG. 10 shows the environment of two units requiring secure communication wherein a third embodiment of the invention is applied.

Attention is drawn to FIG. 10 showing another situation here a further embodiment of the present invention can be employed.

A first unit, in the form of a laptop computer 138 wishes to communicate with a second unit in the form of a fixed Personal computer 140 through an insecure telephone network 142. For security and confidentiality reasons, it is essential that the fixed Personal computer 140 knows that it is actually communicating with the particular laptop computer 138 and vice versa. It is also essential that the information, which may pass between the laptop computer 138 and the fixed Personal computer 140 is kept in strictest confidence. Such situations arise with police forces, security services, military organisations and commercial organisations. A fraudulent communicator must be avoided at all costs.

The situation, shown in FIG. 10, according to the present invention, can be wider. For example, the telephone network 142 can be any set of wired or wireless connections between the first and second unit. The first unit 138 can be a remote surveillance camera, a monitoring station, a SIM card or smart card, or any item which places security at risk should it be replaced for purposes of fraudulent information or communication. The second unit 140 can be a control centre, a communications switching centre, an Internet data server or database system, commercial transaction system, or controlled equipment for a house or factory. The first 138 and second 140 units can also be a pair of telephones, either/or both being fixed or mobile. It is not of particular importance what the exact nature of the first unit 138 and the second unit 140 actually might be. The example, shown hereafter as communication by a laptop computer 138 through an insecure telephone network 142 with a fixed Personal computer 140 is merely exemplary of a situation where maximum security is required.

Figure 11:
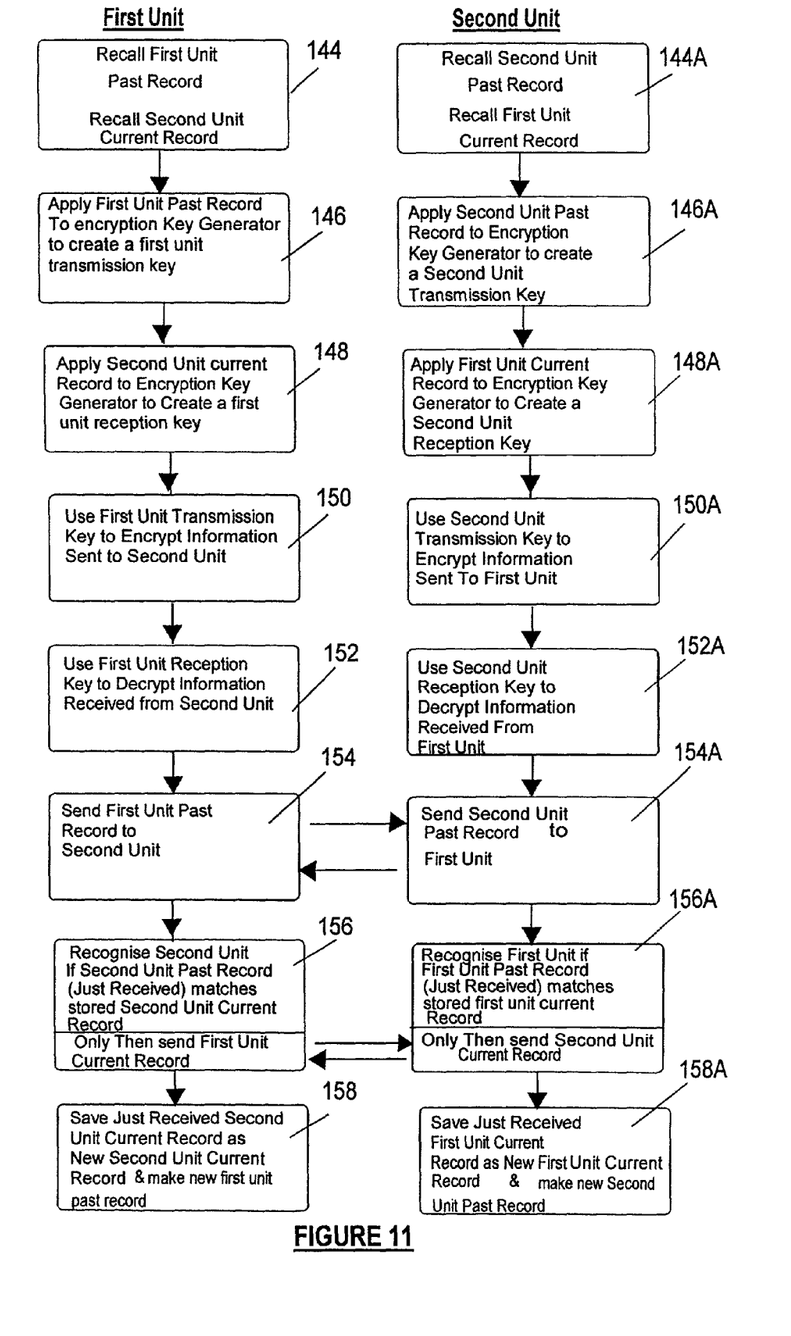
FIG. 11 is a chart of the co-operation between the first and second units of FIG. 10.

FIG. 11 shows how the first unit 138 and the second unit 140 react to one another in a total security environment.

The first unit 138 and the second unit 140 each perform similar but mirror image operations.

In a twenty seventh operation 144–144A the first unit recalls the first unit past record, which it transmitted to the second unit 140 as the first unit current record on the last occasion that the first unit 138 coupled with the second unit 140. The first unit 138 also recalls the second unit current record which was sent to it by the second unit 140 on the previous occasion when the first unit 138 coupled to the second unit 140. Likewise, the second unit 140 recalls the second unit past record which was sent to the first unit 138 as a second unit current record on the last occasion that the first unit 138 coupled to the second unit 140. The second unit 140 also recalls the first unit current record which was sent to the second unit 140 by the first unit 138 on the last occasion that the first unit 138 and the second unit 140 coupled.

In a twenty eighth operation 146–146A the first unit applies the first unit past record (which was sent to the second unit 140 on the last occasion that they coupled) to an encryption key generator which creates a first unit transmission key. Equally, the second unit 140 applies the second unit past record (which was sent to the first unit 138 by the second unit 140 on the last occasion that they coupled) to the encryption key generator to create a second unit transmission key.

In a twenty ninth operation 148–148A, the first unit 138 applies the second unit current record (received on the last occasion of coupling to the second unit 140) to the encryption key generator to create a first unit reception key. Equally, the second unit 140 applies the first unit current record (received from the first unit 138 on the last occasion that they coupled) to the encryption key generator to create a second unit reception key.

In a thirtieth operation 150–150A the first unit 138 uses the first unit transmission key to encrypt all information sent to the second unit 140, and the second unit 140 uses the second unit transmission key to encrypt information sent to the first unit.

In a thirty first operation 152–152A the first unit applies the first unit reception key to decrypt all information received from the second unit 140. In parallel, the second unit 140 applies the second unit reception key to decrypt all information received from the first unit 138.

In a thirty second operation 154–154A the first unit communicates its stored first unit past record to the second unit 140. Equally, the second unit 140 sends its second unit past record to the first unit 138. In this sending and receiving, the encryption keys are employed.

In a thirty third operation 156–156A, the first unit 138 recognises the second unit 140 if the second unit past record, which it has just received from the second unit 140, matches the second unit current record which the first unit 138 stored on the previous occasion of coupling to the second unit. Equally, the second unit 140 recognises the first unit 138 if the first unit past record, which the second unit 140 has just received from the first unit 138, matches the first unit current record which the second unit 140 received from the first unit 138 on the last occasion of coupling to the first unit 138. If any of the encryption and decryption has failed, meaning that one or other of the stored past records is not as it should be, the thirty third operation 156 reverts to a failure mode where additional identification information must be provided before any other attempt at coupling will be engendered.

Only after the first unit 138 has recognised the second unit 140 will the first unit 138 send its first unit current record to the second unit 140. Likewise, only when the second unit 140 has recognised the first unit 138, will the second unit 140 send the second unit current record to the first unit 138. In this way, no potentially useful information to an eavesdropper or interloper is provided. If the attempt at coupling is from a false source, no useful information is given.

Finally, in a thirty fourth operation 158–158A the first unit 138 stores the second unit current record, which it has just received from the second unit 140, as a new second unit current record. The first unit 138 also stores the first unit current record, which it has just sent to the second unit 140, as a new first unit past record.

Equally, the second unit 140 stores the first unit current record, which it has just received from the first unit 138, as a new first unit past record. The second unit 140 also stores the second unit current record, which it has just sent to the first unit 138, as a new second unit past record.

The current records of each of the first and second units can be any reflection of their real time activities. For example, the current record for a computer, could be the time of coupling, or the number of keystrokes, or based on phone numbers used since last coupling, and so on. For smart cards, the current record can be the time of last coupling (on its clock) verified by the time of last coupling as recorded by its downloading station. For a security camera, the exact line number of the scan when coupling occurs is a suitable example.

Even local air temperature could be used. The invention is not limited by any of these examples. The invention encompasses any real-world history which can be reduced to a piece of storable data.

The invention has thus far been explained by way of example. The invention is further explained and clarified by the following claims.

The invention claimed is:

1. A system for recognition of a first unit by a second unit; said first unit being operative to maintain a first unit current record of activities performed by said first unit since the last occasion of coupling to said second unit; said first unit being operative to maintain a first unit past record of activities performed by said first unit up to the last occasion of coupling to said second unit; said first unit being operative, upon coupling to said second unit, to transfer said first unit past record and said first unit current record to said second unit and said second unit being operative to store said first unit current record; and said second unit being operative to grant recognition to said first unit conditionally upon said first unit past record matching the first unit current record, stored by said second unit on the previous occasion of coupling to said first unit.

2. A system, according to claim 1, wherein said first unit is operative to apply an encryption key generator to said first unit past record to construct a first unit encryption key and to apply the first unit encryption key to encrypt information sent to and to decrypt information received from said second unit, and wherein said second unit is operative to apply the encryption key generator to the first unit current record, stored on the previous occasion of coupling to said first unit to construct a second unit encryption key and to apply the second unit encryption key to encrypt information sent to and decrypt information received from said first unit.

3. A system, according to claim 1, wherein said first unit is operative to apply said first unit past record to an encryption key generator to generate a first unit sending encryption key to encrypt information sent to said second unit, wherein said first unit is operative to apply said first unit current record to the encryption key generator to generate a first unit receiving encryption key to decrypt information received from said second unit, wherein said second unit is operative to apply the first unit current record, stored on the last occasion of coupling to said first unit, to the encryption key generator to generate a second unit receiving key for decrypting information received from said first unit, and wherein said second unit is operative, on receiving said first unit current record, to apply the received first unit current record to the encryption generator to generate a second unit transmission key for encrypting information sent to said first unit.

4. An system, according to claim 1, claim 2 or claim 3, wherein said second unit, upon failing to couple to said first unit, is operative to permit said first unit to couple to said second unit on a further single occasion, upon receipt of additional identification data received in relation to said first unit.

5. A system, according to claim 4, wherein said additional identification data is transmissible to said second unit for verification by said second unit by at least one of: by telephone for reception by an operator at said second unit for verification and for the operator to allow said first unit to couple to said second unit; by Internet for reception by an operator at said second unit for verification and for the operator to allow said first unit to couple to said second unit; by telephone for automatic reception by said second unit for said second unit automatically to allow said first unit to couple to said second unit if said additional identification data is valid; and by Internet for automatic reception by said second unit for said second unit automatically to allow said first unit to couple to said second unit if said additional identification data is valid.

6. A system, according to claim 4 wherein said allowing of said first unit to couple to said second unit involves the use of at least one of: a default second unit past record; and a default first unit past record.

7. A system, according to claim 5 wherein said allowing of said first unit to couple to said second unit involves the use of at least one of: a default second unit past record; and a default first unit past record.

8. A system, according to claim 1, wherein; said second unit is operative to maintain a second unit current record of activities performed by said second unit since the last occasion of coupling to said first unit; said second unit is operative to maintain a second unit past record of activities performed by said second unit up to the last occasion of coupling to said first unit; said second unit is operative, upon coupling to said first unit, to transfer said second unit past record and said second current record to said first unit and said first unit is operative to store said second unit current record; and said first unit is operative to grant recognition to said second unit conditionally upon said second unit past record matching the second current record, stored by said first unit on the previous occasion of coupling to said second unit.

9. A system, according to claim 8, wherein said second unit is operative to apply an encryption key generator to the second unit current record, received on the previous occasion of coupling to said second unit, to construct a first unit encryption key and to apply the first unit encryption key to encrypt information sent to and to decrypt information received from said second unit, and wherein said second unit is operative to apply the encryption key generator to the second unit past record to construct a second unit encryption key and to apply the second unit encryption key to encrypt information sent to and decrypt information received from said first unit.

10. A system, according to claim 9, wherein said second unit is operative to apply said second unit past record to an encryption key generator to generate a second unit sending encryption key to encrypt information sent to said first unit, wherein said second unit is operative to apply said second unit current record to the encryption key generator to generate a second unit receiving encryption key to decrypt information received from said first unit, wherein said first unit is operative to apply the second unit current record, stored on the last occasion of coupling to said second unit, to the encryption key generator to generate a first unit receiving key for decrypting information received from said second unit, and wherein said first unit is operative, on receiving said second unit current record, to apply the received second unit current record to the encryption generator to generate a first unit transmission key for encrypting information sent to said second unit.

11. A system, according to any of the claim 1, 8, 9 or 10, wherein said first unit, upon failing to couple to said second unit, is operative to permit coupling of said second unit to said first unit on a further single occasion, upon receipt of additional identification data received in relation to said second unit.

12. A system, according to claim 11, wherein said additional identification data is transmissible to said first unit for verification by said first unit by at least one of: by telephone for reception by an operator at said first unit for verification and for the operator to allow said second unit to couple to said first unit; by Internet for reception by an operator at said second unit for verification and for the operator to allow said second unit to couple to said first unit; by telephone for automatic reception by said second unit for said first unit automatically to allow said second unit to couple to said first unit if said additional identification data is valid; and by Internet for automatic reception by said first unit for said first unit automatically to allow said second unit to couple to said first unit if said additional identification data is valid.

13. A system, according to claim 11 wherein said allowing of said second unit to couple to said first unit involves the use of at least one of: a default second unit past record; and a default first unit past record.

14. A system, according to claim 12, wherein said allowing of said second unit to couple to said first unit involves the use of at least one of: a default second unit past record; and a default first unit past record.

15. A method for establishing recognition of a first unit by a second unit, said method including the steps of; said first unit maintaining a first unit current record of activities performed by said first unit since the last occasion of coupling to said second unit; said first unit maintaining a first unit past record of activities performed by said first unit up to the last occasion of coupling to said second unit; said first unit, upon coupling to said second unit, transferring said first unit past record and said first unit current record to said second unit and said second unit storing said first unit current record; and said second unit granting recognition to said first unit conditionally upon said first unit past record matching the first unit current record, stored by said second unit on the previous occasion of coupling to said first unit.

16. A method, according to claim 15, including the steps of; said first unit applying an encryption key generator to said first unit past record to construct a first unit encryption key and applying the first unit encryption key to encrypt information sent to and to decrypt information received from said second unit; and said second unit applying the encryption key generator to the first unit current record, stored on the previous occasion of coupling to said first unit to construct a second unit encryption key and applying the second unit encryption key to encrypt information sent to and decrypt information received from said first unit.

17. A method, according to claim 15, including the steps of: said first unit applying said first unit past record to an encryption key generator to generate a first unit sending encryption key to encrypt information sent to said second unit; said first unit applying said first unit current record to the encryption key generator to generate a first unit receiving encryption key to decrypt information received from said second unit; said second unit applying the first unit current record, stored on the last occasion of coupling to said first unit, to the encryption key generator to generate a second unit receiving key for decrypting information received from said first unit; and said second unit, on receiving said first unit current record, applying the received first unit current record to the encryption generator to generate a second unit transmission key for encrypting information sent to said first unit.

18. A method, according to any one of claims 15 to 17, including the step of: said second unit, upon failing to couple to said first unit, permitting said first unit to couple to said second unit on a further single occasion, upon receipt of additional identification data received in relation to said first unit.

19. A method, according to claim 18, including receiving said additional identification data by at least one of: by telephone for communication with an operator at said second unit for verification for the operator to allow said first unit to couple to said second unit; by Internet for communication with an operator at said second unit for verification for the operator to allow said first unit to couple to said second unit; by telephone for automatic reception by said second unit, said second unit automatically allowing said first unit to couple to said second unit if said additional identification data is valid; and by Internet for automatic reception by said second unit, said second unit automatically allowing said first unit to couple to said second unit if said additional identification data is valid.

20. A method, according to claim 18 wherein said permitting of said first unit to couple to said second unit involves the use of a common default past record.

21. A method, according to claim 18 wherein said permitting of said first unit to couple to said second unit involves the use of a common default past record.

* * * * *